J. C. RATLIFF & J. W. TOWLE.
Harvester-Dropper.
No. 168,670.
Patented Oct. 11, 1875.
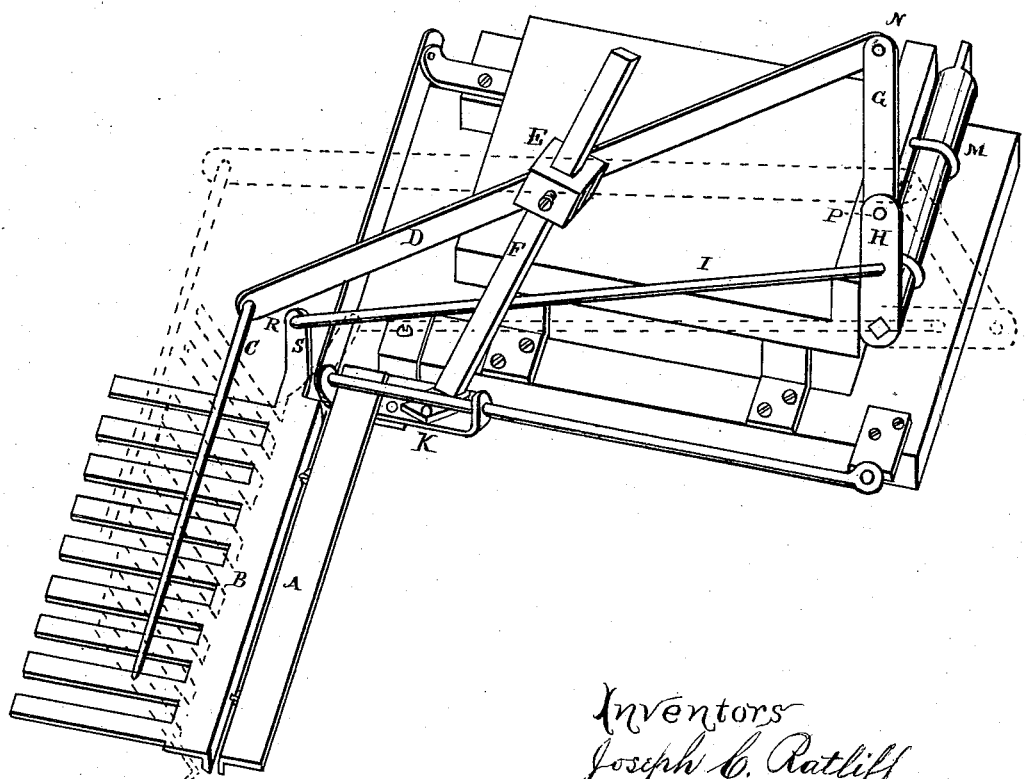

UNITED STATES PATENT OFFICE.

JOSEPH C. RATLIFF AND JAMES W. TOWLE, OF RICHMOND, INDIANA.

IMPROVEMENT IN HARVESTER-DROPPERS.

Specification forming part of Letters Patent No. 168,670, dated October 11, 1875; application filed February 6, 1875.

*To all whom it may concern:*

Be it known that we, JOSEPH C. RATLIFF and JAMES W. TOWLE, of Richmond, county of Wayne and State of Indiana, have invented certain Improvements in Cut-Off Fingers for Reaper Attachments, of which the following is a specification:

Our invention relates to an improved arrangement of the cut-off finger for reaper attachments, said cut-off finger being arranged in relation to the dropper, and hung or pivoted in such a manner as to operate conjointly with said dropper in a novel and efficient manner, the whole to be operated by means of a treadle, which treadle is operated by the foot of the driver, as hereinafter fully described.

The drawing is a perspective view, showing the dropper and cut-off finger attached to a reaper.

A is the sickle-bar; B, the dropper attached to the same; C, the cut-off finger attached to the vibrating bar D, which bar is pivoted, near its center, to the adjustable sliding block E, which block is adjusted up or down upon the reel-post F, which post is attached at its lower end to the shoe K of the machine. The bar D is attached at one end to the loose connection G, which connection is attached to the crank H, which is attached to the crank-shaft M, by which the whole is operated.

When the crank-shaft M is thrown forward by the foot of the driver it will be seen that the pivot or joint P is thrown forward, bringing down the forward end of the vibrating bar D, and consequently raises the cut-off finger C, the whole being thrown into the position shown by the dotted lines in the drawing.

The rod I connects the crank H and the crank S, and exerts a force nearly at right angles thereto. The vibrating bar D is also connected to the crank H, but through the connecting-bar G. Hence the crank H does not exert a force upon bar D so nearly at right angles, and raises the cut-off finger more slowly than the dropper B, and vice versa.

Another feature of our arrangement is shown by the position represented by the dotted lines, as, when the cut-off finger and dropper are thrown up and forward, the rod I, which connects cranks H and S, is thrown parallel to the axis of the crank-shaft M, and is consequently held in position with very little force until it is desired to drop the cut-off finger and dropper, which recede at varying speed, in consequence of the dropper being connected to the crank H through the rod I, while the bar D, to which the cut-off finger is attached, is connected to said crank H through the connection G.

Having thus fully described our invention, what we claim, and desire to secure by Letters Patent, is—

1. In combination with the crank H, pivoted bar D, and cut-off finger C, the connecting-bar G, arranged substantially as shown and described, for the purpose specified.

2. In combination with the reel-post F, the sliding adjustable block E, pivoted bar D, cut-off finger C, connecting-bar G, and crank H, for the purpose specified.

JOSEPH C. RATLIFF.
JAMES W. TOWLE.

Witnesses:
CALEB ELLIOTT,
WILLIAM N. MATTHEWS.